R. A. SPINK.
TIRE PATCH OR THE LIKE.
APPLICATION FILED JAN. 15, 1921.

1,409,601.  Patented Mar. 14, 1922.

Inventor
R. A. Spink.

By
Geo. P. Kimmel.
Attorney

UNITED STATES PATENT OFFICE.

RICHARD A. SPINK, OF OSHKOSH, WISCONSIN.

TIRE PATCH OR THE LIKE.

1,409,601.

Specification of Letters Patent.  Patented Mar. 14, 1922.

Application filed January 15, 1921. Serial No. 437,498.

*To all whom it may concern:*

Be it known that I, RICHARD A. SPINK, a citizen of the United States, residing at Oshkosh, in the county of Winnebago and State of Wisconsin, have invented certain new and useful Improvements in a Tire Patch or the like, of which the following is a specification.

This invention relates to improvements in tire patch structures and the invention has for its object to provide a reinforced sheet material having malleable metallic reinforcing elements incorporated therein which will materially strengthen the material without appreciably detracting from the flexible qualities thereof and which will equally well adapt the material for various other uses such for instance, as tire casings, reliners for such casings, roofing, floor matting and the like.

A further object is the provision of a reinforced sheet material in which the reinforcing elements are interwoven with cotton, hemp or other fibrous cord to provide a protective covering and anchoring means for the reinforcing element and also providing an adequate base upon which covering layers of fabric or other material may be effectively secured by appropriate adhesive.

With these and other objects in view, the invention consists in certain novel features of construction as hereinafter shown and described, and then specifically pointed out in the claim.

Figure 1:
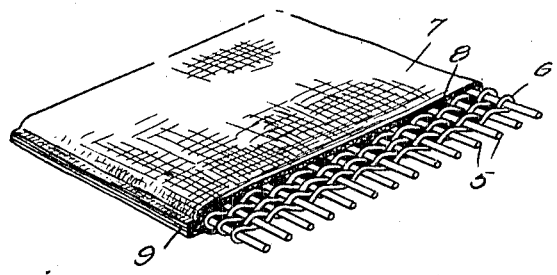
Figure 2:
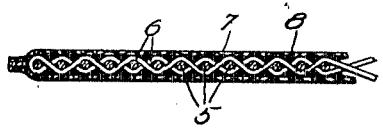
Figure 3:
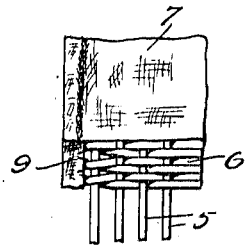

In the accompanying drawing:

Figure 1 is a fragmentary perspective view of a piece of material constructed in accordance with the invention, the various layers or portions of the material being broken away to show the construction and arrangement thereof, Fig. 2 is a transverse section through the sheet material, partly broken away, and, Figure 3 is a fragmentary plan view with portions of the material broken away to show the particular construction and arrangement of the reinforcement.

Referring to the drawing in detail, wherein similar reference numerals designate corresponding parts throughout the several views, the numerals 5 indicate a base fabricated material formed of a plurality of closely arranged and parallel strands of flexible metal such for instance as annealed copper or other malleable metal, and cords 6 of cotton, hemp or other similar fibrous material possessing a high degree of strength and durability which are interwoven with the reinforcing members 5 after the manner in which the woof threads of textile fabrics are interwoven with the warp threads, the terminals of the strands of the cord 6 being turned once about the outermost reinforcing members as indicated in Fig. 2.

Outer or facing layers of fabric 7 are positioned against the opposite side faces of the fabricated base material constituted by the reinforcing bars 5 and the interwoven cords 6, and these outer layers 7 are permanently secured in position by means of coatings of raw rubber or other suitable adhesive material 8, which material is applied to both sides of the base material to provide interposed layers thereof extending over the entire area of the latter. These outer layers are of a size to admit of their opposite side edges extending beyond the side edges of the base material, where they are suitably secured together as at 9, by the surplus of the rubber or adhesive material at the adjacent side edges of the base, or by a film of the latter applied thereto for the purpose, and whereby the base material is completely encased within the layers.

It is to be understood that various changes in the materials specified, and the dimensions of the completed article may be resorted to without departing from the spirit and scope of the invention.

What is claimed is:

A tire patch comprising a base formed of a plurality of metal reinforcing elements laid in a common plane one parallel to the other, a fibrous material interwoven with the said reinforcing elements, outer facing layers of fabricated material disposed at opposite sides of said base, and rubber coatings applied to the opposite side faces of said base and the opposed faces of said fabricated layers for the thorough vulcanization of the base and layers together, the rubber coatings filling the interstices of the base and extending outwardly of the edges thereof to assure the securing together of the projecting side edges of said fabricated layers.

In testimony whereof, I affix my signature hereto.

RICHARD A. SPINK.